United States Patent
Ueno et al.

(10) Patent No.: US 7,217,931 B2
(45) Date of Patent: May 15, 2007

(54) RADIOLOGICAL IMAGING APPARATUS AND ITS DETECTOR UNIT

(75) Inventors: Yuuichirou Ueno, Hitachi (JP); Shinichi Kojima, Hitachi (JP); Norihito Yanagita, Hitachi (JP); Kensuke Amemiya, Hitachinaka (JP); Hiroshi Kitaguchi, Naka (JP); Katsutoshi Tsuchiya, Hitachi (JP); Kazuma Yokoi, Hitachi (JP); Takafumi Ishitsu, Hitachi (JP)

(73) Assignee: Hitachi, Ltd. (JP)

( * ) Notice: Subject to any disclaimer, the term of this patent is extended or adjusted under 35 U.S.C. 154(b) by 304 days.

(21) Appl. No.: 11/032,092

(22) Filed: Jan. 11, 2005

(65) Prior Publication Data

US 2005/0151087 A1 Jul. 14, 2005

(30) Foreign Application Priority Data

Jan. 13, 2004 (JP) ............................. 2004-005620

(51) Int. Cl.
*G01T 1/24* (2006.01)
(52) U.S. Cl. ................................. 250/370.09
(58) Field of Classification Search ............ 250/370.09
See application file for complete search history.

(56) References Cited

U.S. PATENT DOCUMENTS

| 4,394,576 | A |  | 7/1983 | Tanaka et al. |  |
| 4,831,639 | A |  | 5/1989 | Harke |  |
| 2001/0025928 | A1 |  | 10/2001 | LIngren et al. |  |
| 2005/0067572 | A1 | * | 3/2005 | Amemiya et al. | 250/363.05 |
| 2005/0067578 | A1 | * | 3/2005 | Ueno et al. | 250/370.09 |
| 2005/0067579 | A1 | * | 3/2005 | Tsuchiya et al. | 250/370.15 |
| 2005/0167600 | A1 | * | 8/2005 | Amemiya et al. | 250/363.05 |
| 2005/0178969 | A1 | * | 8/2005 | Amemiya et al. | 250/363.05 |
| 2005/0178970 | A1 | * | 8/2005 | Amemiya et al. | 250/370.09 |
| 2005/0199816 | A1 | * | 9/2005 | Amemiya et al. | 250/363.05 |
| 2006/0065848 | A1 | * | 3/2006 | Ueno et al. | 250/370.15 |
| 2006/0186341 | A1 | * | 8/2006 | Ueno et al. | 250/363.05 |
| 2006/0241386 | A1 | * | 10/2006 | Yanagita et al. | 600/415 |
| 2006/0243915 | A1 | * | 11/2006 | Amemiya et al. | 250/363.05 |

FOREIGN PATENT DOCUMENTS

| JP | 2003-079614 | 3/2003 |
| JP | 2003-167058 | 6/2003 |
| JP | 2003-185750 | 7/2003 |

* cited by examiner

*Primary Examiner*—David Porta
*Assistant Examiner*—Christopher Webb
(74) *Attorney, Agent, or Firm*—Dickstein Shapiro LLP (57) ABSTRACT

A radiological imaging apparatus capable of improving an arrangement density of semiconductor radiation detectors and detector units thereof, each detector unit consisting of a plurality of combined substrates having a detector substrate which includes semiconductor radiation detectors and a signal processing substrate which includes integrated circuits, housed in a housing. The detector substrate protrudes outward from an opening of the housing. A plurality of detector units are attached to a ring-shaped unit support section in a circumferential direction thereof. More specifically, the detector substrate protrudes inward from the unit support section and the housing is attached to the unit support section.

17 Claims, 10 Drawing Sheets

RADIOLOGICAL IMAGING APPARATUS AND ITS DETECTOR UNIT

BACKGROUND OF THE INVENTION

The present invention relates to a radiological imaging apparatus and detector unit thereof.

A radiological imaging apparatus such as a positron emission tomography (hereinafter referred to as "PET apparatus") for diagnosing an examinee by detecting radiation emitted from the examinee given radioisotope and laid on an examining table using detectors arranged around the examinee is known.

The PET apparatus is an apparatus which administers radioisotope to an examinee, detects γ-rays emitted from within the body of this examinee using γ-ray detectors arranged around the examinee and outputs a two-dimensional or three-dimensional image of the examinee (e.g., see JP-A-2003-185750 (paragraph 0002, FIG. 12)).

In a nuclear medicine diagnosis using such a radiological imaging apparatus, a diagnosis is conducted by obtaining a two-dimensional or three-dimensional image of the examinee. For this purpose, it is important to obtain a two-dimensional or three-dimensional image with high resolution using the radiological imaging apparatus and to attain this object, for example, hundred thousand (hundred thousand channels) or more detectors are used for the radiological imaging apparatus. Furthermore, since detailed diagnoses are often conducted using a slice image in the direction of the body axis of the examinee, it is important to obtain a slice image with high resolution. To attain this object, it is necessary to arrange many detectors in a close-packed manner and a close-packed arrangement in the circumferential direction is particularly important. On the other hand, when many detectors are used, maintenance thereof may become difficult.

However, conventionally there have not been enough studies on a structure which would satisfy both a structure of equipment for obtaining an image with high resolution and a structure of equipment for making maintenance easier.

It is an object of the present invention to provide a radiological imaging apparatus and detector unit thereof capable of facilitating replacement of radiation detectors and improving an arrangement density of radiation detectors.

SUMMARY OF THE INVENTION

In the radiological imaging apparatus to attain the above described object, a detector unit supported by a ring-shaped support member consists of a plurality of unit substrates including a plurality of semiconductor radiation detectors and integrated circuits which process radiation detection signals output from these semiconductor radiation detectors and a housing in which these unit substrates are housed and attached, constructed in such a way that areas of the plurality of unit substrates in which the semiconductor radiation detectors exist protrude from an opening of the housing, the above described areas of the detector units are disposed inside the support member and the housing is supported by the support member.

Since the areas of the plurality of detector units housed in the housing supported by the support member in which the semiconductor radiation detectors exist protrude from the opening of the housing and disposed inside the support member, no housing exists between the neighboring detector units in the circumferential direction of the support member. Thus, it is possible to bring the semiconductor radiation detectors of the neighboring detection units inside the support member closer to each other and improve an arrangement density of semiconductor radiation detectors in the circumferential direction of the support member. This improves the detection spatial resolution of γ-rays and improves positional resolution of a tomogram of an examinee. Providing a tomogram with high positional resolution makes it possible to detect smaller cancers and conduct a detailed diagnosis. It also allows detector units to be replaced unit by unit and facilitates replacement of the radiation detectors.

The housing is preferably attached to the support member in a detachable manner. This makes it possible to remove the detector unit from the support member and attach the detector unit to the support member in a short time.

The unit substrate preferably includes a first substrate and a second substrate, the first substrate preferably includes semiconductor radiation detectors and the second substrate preferably includes integrated circuits. When a problem occurs in a semiconductor radiation detector or integrated circuit, the portion including the problem, that is, the first substrate including the semiconductor radiation detector with the problem (or second substrate including the integrated circuit with the problem) can be replaced. This eliminates such waste that the entire unit substrate should be replaced because some elements have a problem.

The semiconductor radiation detectors are preferably disposed on both sides of the unit substrate. This makes it possible to reduce the number of substrates and increase the arrangement density of semiconductor radiation detectors accordingly.

The surface of the unit substrate on which the semiconductor radiation detectors are mounted is preferably disposed in the direction in which the bed is moved. This improves the arrangement density of the semiconductor radiation detectors of the detector unit in the circumferential direction of the support member. This further improves the γ-ray detection positional resolution and also improves the positional resolution of a tomogram of the examinee.

The surface of the unit substrate on which the semiconductor radiation detectors are mounted is preferably disposed in the circumferential direction of the support member. This allows the number of semiconductor radiation detectors which can be mounted per unit substrate to be increased. Furthermore, it is possible to improve an arrangement density of semiconductor radiation detectors in the axial direction of the support member.

Inclined planes are preferably formed in corners of the unit substrate located inside the support member and the neighboring unit substrates in the circumferential direction of the support member preferably have their inclined planes contacting each other. Since the inclined planes are formed in the corners, it is possible to minimize the space between the detector units disposed in the circumferential direction. This further improves the arrangement density of semiconductor radiation detectors in the circumferential direction.

The unit substrate preferably includes an electromagnetic shielding member which covers the integrated circuits. This prevents electromagnetic waves generated in the integrated circuits from entering the semiconductor radiation detectors. This suppresses the superimposition of noise caused by electromagnetic waves on feeble radiation detection signals output from the semiconductor radiation detectors and this reduction of noise improves the time accuracy of radiation detection.

The detector unit preferably arranges electromagnetic shielding members which shields the space in the housing between the integrated circuits and semiconductor radiation detectors of the respective unit substrates. Shielding the space in the housing with the electromagnetic shielding member can prevent electromagnetic waves generated in the integrated circuits from entering the semiconductor radiation detectors and suppress the superimposition of noise caused by electromagnetic waves on feeble radiation detection signals output from the semiconductor radiation detectors.

The electromagnetic shielding member preferably has elasticity and this facilitates the shielding of the space in the housing.

The electromagnetic shielding cylinder is preferably disposed inside one end of the unit substrate disposed inside the support member of the unit substrate and the bed is preferably inserted in this electromagnetic shielding cylinder. This allows the electromagnetic shielding cylinder to block electromagnetic waves from the outside and prevents outside electromagnetic waves from entering the semiconductor radiation detectors and suppresses the superimposition of noise on radiation detection signals.

The portions of the respective detector units disposed inside the support member of the unit substrate are preferably covered with a light shielding cover. This prevents light from entering the semiconductor radiation detector and reduces noise components of the light output from the photosensitive semiconductor radiation detectors.

The light shielding cylinder is preferably disposed inside one end of the unit substrate disposed inside the support member of the unit substrate and the bed is preferably inserted into this light shielding cylinder. This prevents light from entering the semiconductor radiation detectors and reduces noise components of the light output from the photosensitive semiconductor radiation detectors.

A cover having an electromagnetic shielding function and light shielding function is preferably disposed outside the support member and outside a plurality of detector units and attached to the support member. Providing the cover in this way can prevent outside electromagnetic waves and light from entering the semiconductor radiation detectors.

The present invention facilitates replacement of the radiation detectors and can improve an arrangement density of radiation detectors. This allows, for example, the radiological imaging apparatus to obtain a clear image of the examinee.

Other objects, features and advantages of the invention will become apparent from the following description of the embodiments of the invention taken in conjunction with the accompanying drawings.

DESCRIPTION OF THE EMBODIMENTS

With reference now to the attached drawings, embodiments of the present invention will be explained below.

(First Embodiment)
With reference to FIGS. 1 to 7, a first embodiment of the present invention will be explained.

Figure 1:
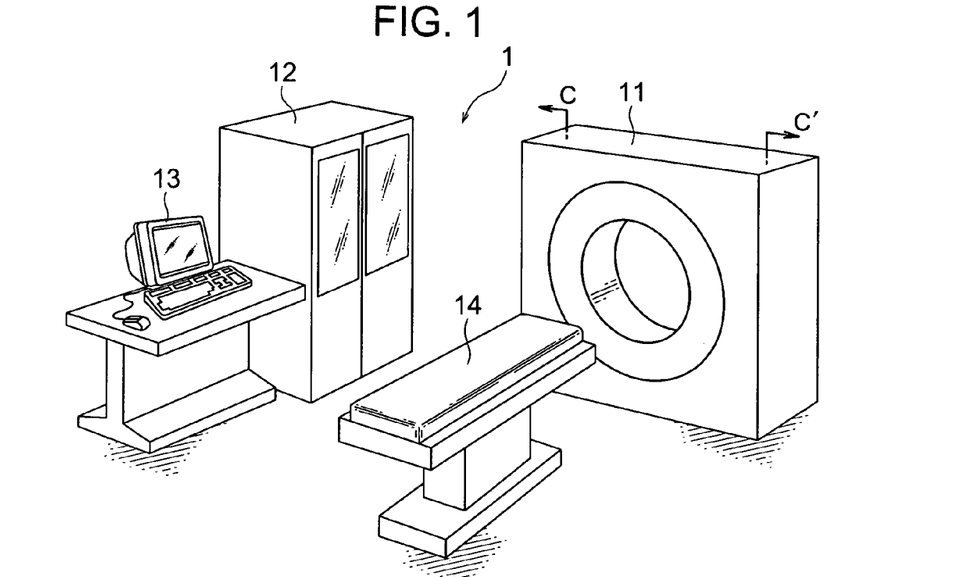
FIG. 1 is a perspective view showing the basic structure of a PET apparatus (radiological imaging apparatus) 1 of the present invention.

As shown in FIG. 1, a PET apparatus 1 (radiological imaging apparatus) is constructed by including an imaging apparatus 11, a data processing apparatus 12 which processes detection data obtained by this imaging apparatus 11 and converts the detection data to image data, a display device 13 which displays the image data (PET image information) output from this data processing apparatus 12 two-dimensionally or three-dimensionally and an examining table 14 on which an examinee is laid.

The examinee is given radiopharmaceutical, for example, fluorodeoxyglucose (FDG) containing $^{18}F$ having a half life of 110 minutes and pairs of γ-rays (radiation) generated when FDG positrons are annihilated are emitted from within the body of the examinee in directions of 180°±0.6° simultaneously. The radiopharmaceutical used in an inspection using the PET apparatus 1 emits positrons each of which generates a pair of γ-rays such as $^{18}F$ at the time of annihilation.

Figure 2:
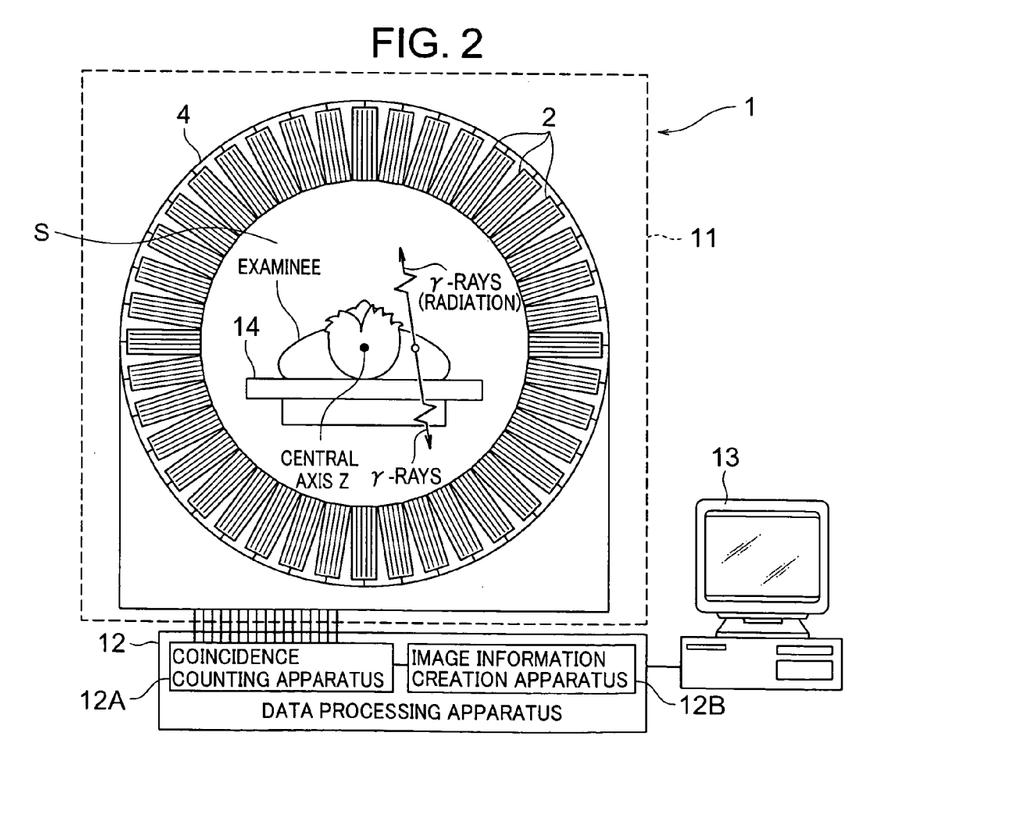
FIG. 2 is a cross-sectional view schematically showing a section (section C–C' in FIG. 1) in the circumferential direction of an imaging apparatus with an examinee laid on the PET apparatus (radiological imaging apparatus) 1 of the present invention.

As shown in FIG. 2, the imaging apparatus 11 includes a detection section 4 made up of many detector units 2 which include many radiation detectors (hereinafter referred to as "detectors") 21 (see FIGS. 3A and 3B; details will be described later) which detect γ-rays (radiation) emitted from within the body of the examinee, arranged in the circumferential direction so as to surround the examining table (bed) 14 inserted in a space S.

Then, the imaging apparatus 11 detects γ-rays emitted from within the body of the examinee who lies on the examining table 14 using many detectors 21 and captures a PET image of the examinee. As shown in FIG. 2, by taking advantage of the nature that pairs of γ-rays are emitted from an area where radiopharmaceutical is concentrated (e.g., area affected by a cancer) in 180-degree opposite directions provoked by the radiopharmaceutical, the imaging apparatus 11 identifies the position of the source (area where radiopharmaceutical is concentrated) of γ-rays in the body of the examinee. The structure of the detection section 4 including the detector units 2 shown in FIG. 2 here is shown schematically to illustrate the arrangement and a detailed structure will be explained more specifically later.

As shown in FIG. 2, the data processing apparatus 12 includes a storage apparatus, a coincidence counting apparatus 12A and an image creation apparatus 12B. The data processing apparatus 12 incorporates data (packet data which will be described later) output from the detector units 2. The coincidence counting apparatus 12A identifies from the pair of γ-rays incorporated, the positions of a pair of the detectors 21 which have detected these γ-rays and stores the position information of these detectors in the storage apparatus. The image information creation apparatus 12B creates PET image information (tomogram information) on the examinee based on these identified positions and displays the PET image on the display device 13.

Next, the main components will be explained more specifically.

Figure 3A:
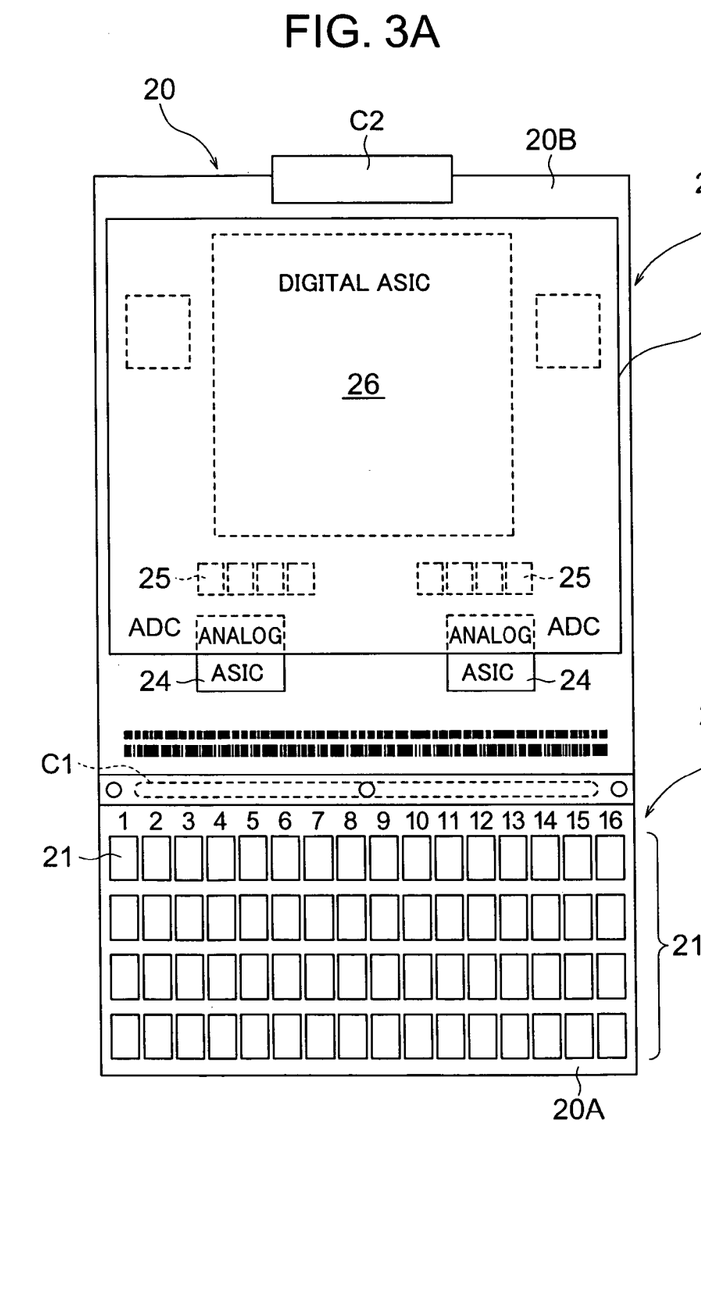
FIG. 3A is a front view of an entire combined substrate 20 of a detector unit according to a first embodiment.
Figure 3B:
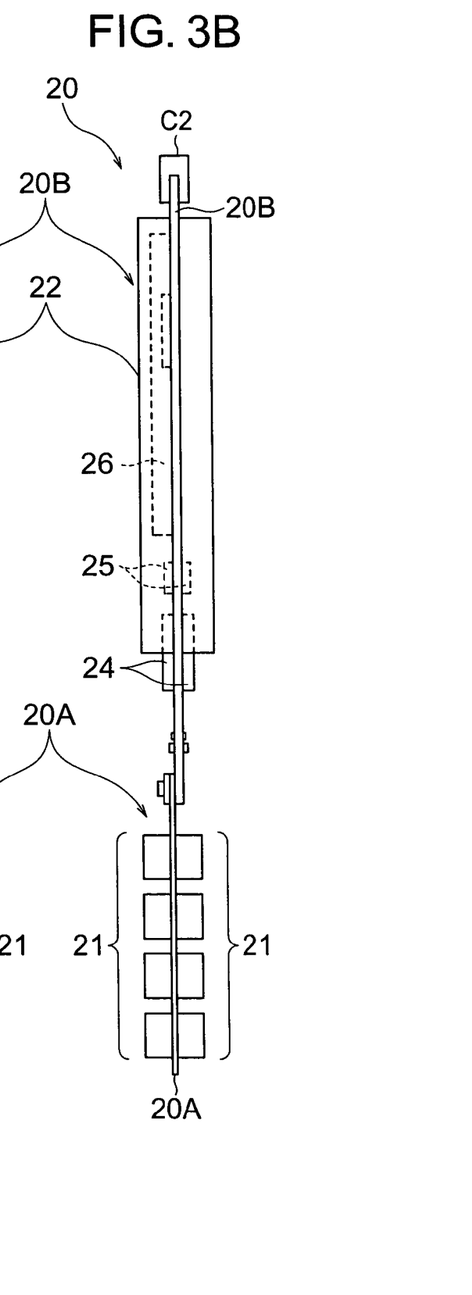
FIG. 3B is a side view of the combined substrate 20.

With reference to FIG. 3, a plurality of combined substrates (unit substrates) 20 housed in the detector unit 2 will be explained.

The combined substrate 20 is constructed of a detector substrate 20A, a signal processing substrate 20B, an electromagnetic shielding cover 22 and a substrate connector C2. The detector substrate 20A and signal processing substrate 20B are provided with overlapping portions which overlap with each other near their respective ends and electrically connected by connecting their respective connectors C1 which exist in these overlapping portions. The detector substrate (first substrate) 20A and signal processing substrate (second substrate) 20B are connected through the overlapping portions in a detachable manner by means of a screw (not shown). The combined substrate 20 may also be constructed of a single substrate provided with the respective elements for the detector substrate 20A and signal processing substrate 20B.

The substrate connector C2 is provided at the other end of the signal processing substrate 20B to electrically and mechanically connect the combined substrate 20 to a housing 30 (see FIG. 4) of the detector unit 2.

As shown in FIGS. 3A and 3B, the detector substrate 20A has a plurality of detectors 21 arranged two-dimensionally on both sides (a total of 64 detectors; 16 horizontally×4 vertically per side in the figure). These 16 horizontal detectors 21 are arranged in the direction of the central axis Z of the imaging apparatus 11, that is, in the longitudinal direction of the examining table 14. Furthermore, the detectors 21 are arranged in four rows in the radius direction of the detection section 4. The detectors 21 arranged on the detector substrate 20A are preferably arranged as densely as possible on the detector substrate 20A. This is because as the mounting rate of the detectors 21 increases (gap between neighboring detectors 21 becomes narrower), the γ-ray detection efficiency improves and as the array pitch of the detectors 21 is reduced, the spatial resolution of a PET image captured increases.

The detector 21 has an area of 4 to 120 mm$^2$ and has a parallel array structure in which a plurality of single crystals of a thin semiconductor material are mutually partitioned by electrodes and arranged in the thickness direction of the single crystals. This semiconductor material is made of any one of single crystals such as CdTe (cadmium telluride), TlBr (thallium bromide) and GaAs (gallium arsenide). Furthermore, for the electrodes, any one of materials such as Pt (platinum), Au (gold), In (indium) is used. The detector 21 is a semiconductor radiation detector.

In such a structure, the examining table 14 on which the examinee who has been given radiopharmaceutical is laid is moved and the examinee is inserted into the space S surrounded by a plurality of detector units 2. Each of the plurality of detectors 21 detects 511 keV γ-rays (radiation) emitted from within the body of the examinee and outputs a γ-ray detection signal (radiation detection signal) corresponding to the energy of γ-rays (energy produced by interaction with a semiconductor material). Though detailed explanations are omitted, based on a pulse height and time information of the detected γ-rays and address information (detector ID) corresponding to the detected detector 21, the positions of a pair of detectors 21 which have detected a pair of γ-rays having a pulse height exceeding a set value are identified.

The signal processing substrate 20B is provided with integrated circuits (digital ASIC 26, ADCs 25 and analog ASICs 24) which are signal processing apparatus for processing γ-ray detection signals output from the respective detectors 21. These integrated circuits amplify feeble γ-ray detection signals of radiation (γ-rays) detected by the detectors 21 and measure the energy of the detected γ-rays and time at which radiation is detected. With a detector ID added, this energy and detection time data are integrated into packet data (digital data) and transferred to the data processing apparatus 12 (see FIG. 2) via the substrate connector C2.

As described above, this data processing apparatus 12 identifies the respective positions of many pairs of detectors 21 which have detected many pairs of γ-rays (radiation) based on this transferred packet data and displays PET image information created using the position information on the display device 13. More specifically, the coincidence counting apparatus 12A compares the detection time data of the plurality of detection data pieces and decides two data pieces which fall within a coincidence counting time window length (e.g., 10 ns) as an effective data pair. Furthermore, the image creation apparatus 12B accumulates flight direction data of the γ-ray pair from the detector ID of the effective data pair, reconstructs an image from this data, generates PET image information and displays the PET image information on the display device 13.

The electromagnetic shielding cover 22 is disposed on the signal processing substrate 20B so as to cover the integrated circuits. This is intended to prevent a phenomenon that electromagnetic waves generated from the integrated circuits act on the detector 21 causing a noise component to superimpose on feeble analog signals output from the detectors 21 and deteriorating an SN ratio. Thus, this electromagnetic shielding cover 22 is preferably constructed so as to cover all the integrated circuits which generate electromagnetic waves without gaps to prevent electromagnetic waves from leaking and directly irradiating the detectors 21 or prevent electromagnetic waves (noise) from superimposing on feeble analog signals output from the detectors 21. Furthermore, the material of the electromagnetic shielding cover 22 is aluminum or an aluminum alloy. Half of the analog ASICs 24 on the detector 21 side is not covered with the electromagnetic shielding cover 22. This is because this part includes input terminals of the feeble analog signals output from the detectors 21. Furthermore, digital signals are input/output to/from the analog ASICs 24 on the opposite side of the detectors 21 and the coverage with the electromagnetic shielding cover 22 is also intended to limit emissions of electromagnetic waves from these parts. The height of the electromagnetic shielding cover 22 from the surface of the signal processing substrate 20B is smaller than the height of the detector 21 from the surface of the detector substrate 20A.

Figure 4:
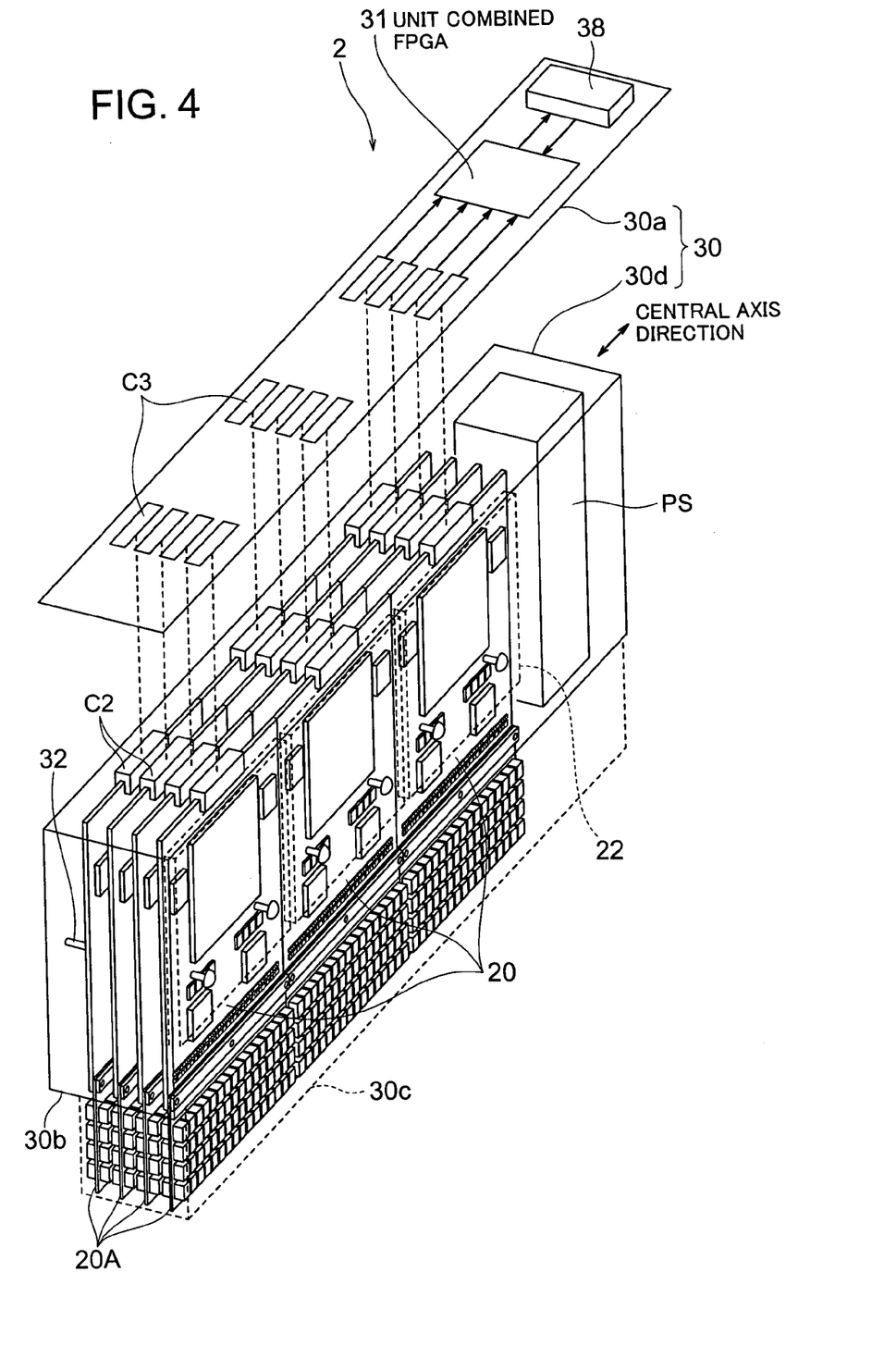
FIG. 4 is a perspective view showing the internal structure of a detector unit 2 according to the first embodiment.

As shown in FIG. 4, the detector unit 2 is provided with a plurality of (3×4=12 substrates in the figure) the aforementioned combined substrates 20, a high-voltage power supply PS which supplies voltages to these 12 combined substrates 20, an FPGA 31 which integrates the packet data output from the respective combined substrates 20 via the substrate connectors C2, a data transfer apparatus 38 which transmits the integrated packet data to the data processing apparatus 12 and a steel case or a housing 30 which supports and houses these components.

As shown in FIG. 4, the housing 30 has a tubular body 30*d* whose section is rectangular (preferably oblong) and a top plate 30*a* is put on one end of the tubular body 30*d*. The tubular body 30*d* has side walls in four directions. The space in the housing 30 is open at the other end of the tubular body 30*d*. The other end of the tubular body 30*d* is an open end 30*b*. The twelve combined substrates 20 are arranged with their surfaces facing the wide side wall of the tubular body 30*d*. Three combined substrates 20 are arranged in series in the longitudinal direction of the housing 30 and four combined substrates 20 are arranged in parallel in the direction perpendicular to the longitudinal direction. The top plate 30*a* is provided with receiving side connectors C3. These receiving side connectors C3 are connected to the substrate connectors C2 provided on one end of the combined substrates 20 to thereby connect the housing 30 and the combined substrates 20. Furthermore, the combined substrates 20 are fixed to the housing 30 by substrate fixing bars 32 which penetrate parts of the signal processing substrates 20B. The high-voltage power supply PS is attached to the tubular body 30*d*.

The areas where the detectors 21 of the detector substrates 20A are mounted protrude from the opening end 30*b* of the tubular body 30*d*. That is, all the detectors 21 provided on the combined substrate 20 are located outside the housing 30.

The detector 21 made of a semiconductor material of CdTe used in this embodiment reacts with light and generates charge, and is therefore light-shielded so as to prevent outside light from entering and irradiating this detector 21. More specifically, the housing 30 and a unit support section 41 shown in FIG. 6 are made of a light-shielding material such as aluminum or an aluminum alloy and are constructed so as to eliminate gaps through which light enters including the parts where the housing 30 and the unit support section 41 engage with each other.

Figure 5:
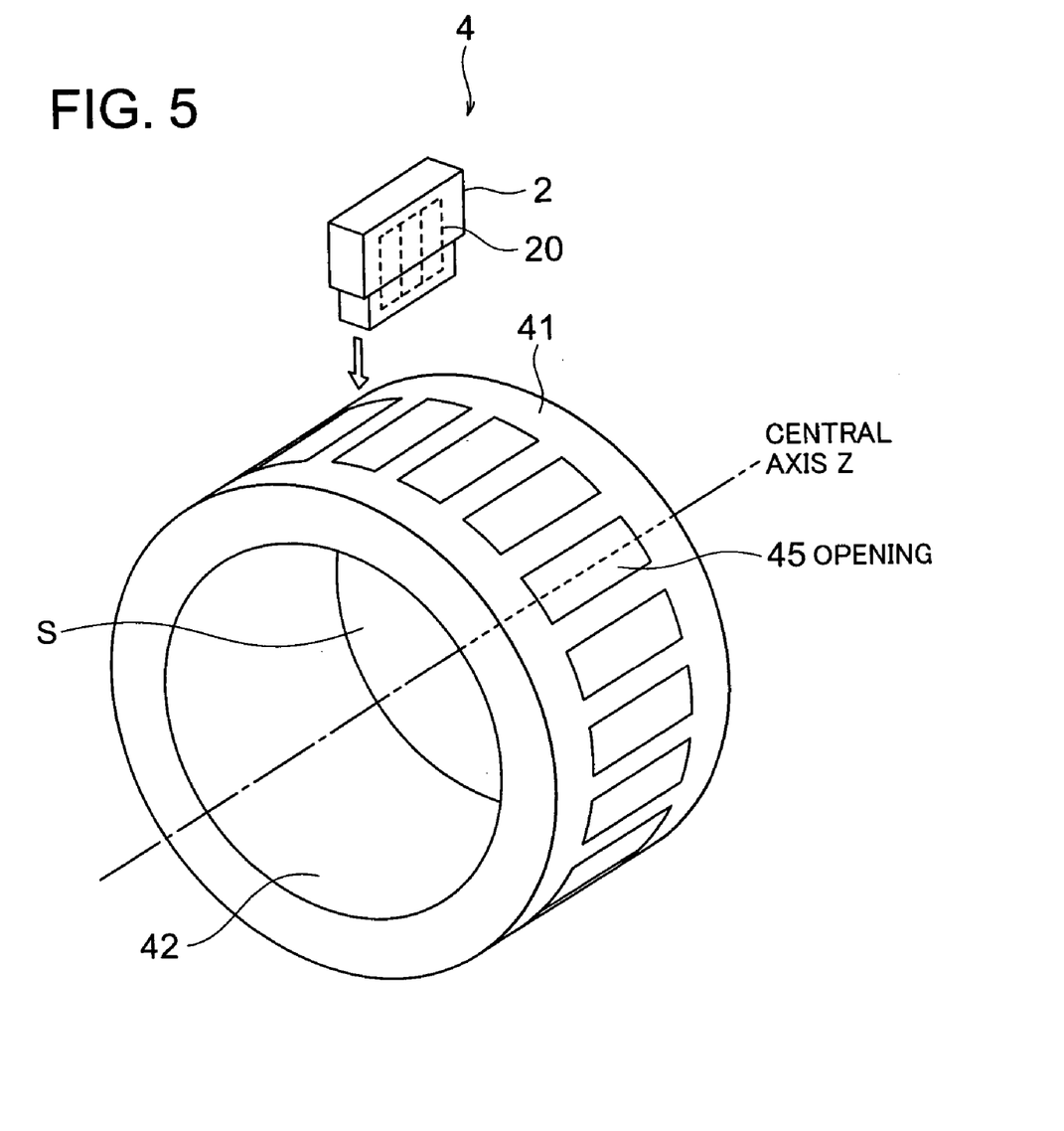
FIG. 5 is a perspective view showing the mode in which the detector unit 2 according to the first embodiment is mounted in a detection section 4 of the PET apparatus.

For light entering from the direction of the space S, a cylinder-shaped light shielding cylinder 42 is disposed so that the outer surface thereof is located near the free end of the detector substrate 20A to prevent this light from reaching the detectors 21. The light shielding cylinder 42 made of an aluminum alloy (or aluminum) is attached to the unit support section 41. As shown in FIG. 5, this light shielding cylinder 42 forms the inner surface of the cylinder-shaped detection section 4 and both side walls of the detection section 4 (side walls in the longitudinal direction of the examining table 14) located inside the unit support section 41. As another method for preventing light from entering from the direction of this space S, as shown in FIG. 4, it is also possible to provide a light shielding cover 30*c* shown by a dotted line below the housing 30 so as to cover the entire detector substrate 20A exposed from the opening end 30*b*. It is also possible to apply a light shielding film to the detectors 21 instead of the light shielding cover 30*c*. The light shielding cylinder 42 is also an electromagnetic shielding member.

Returning to FIG. 6, explanations will be continued.

Figure 6:
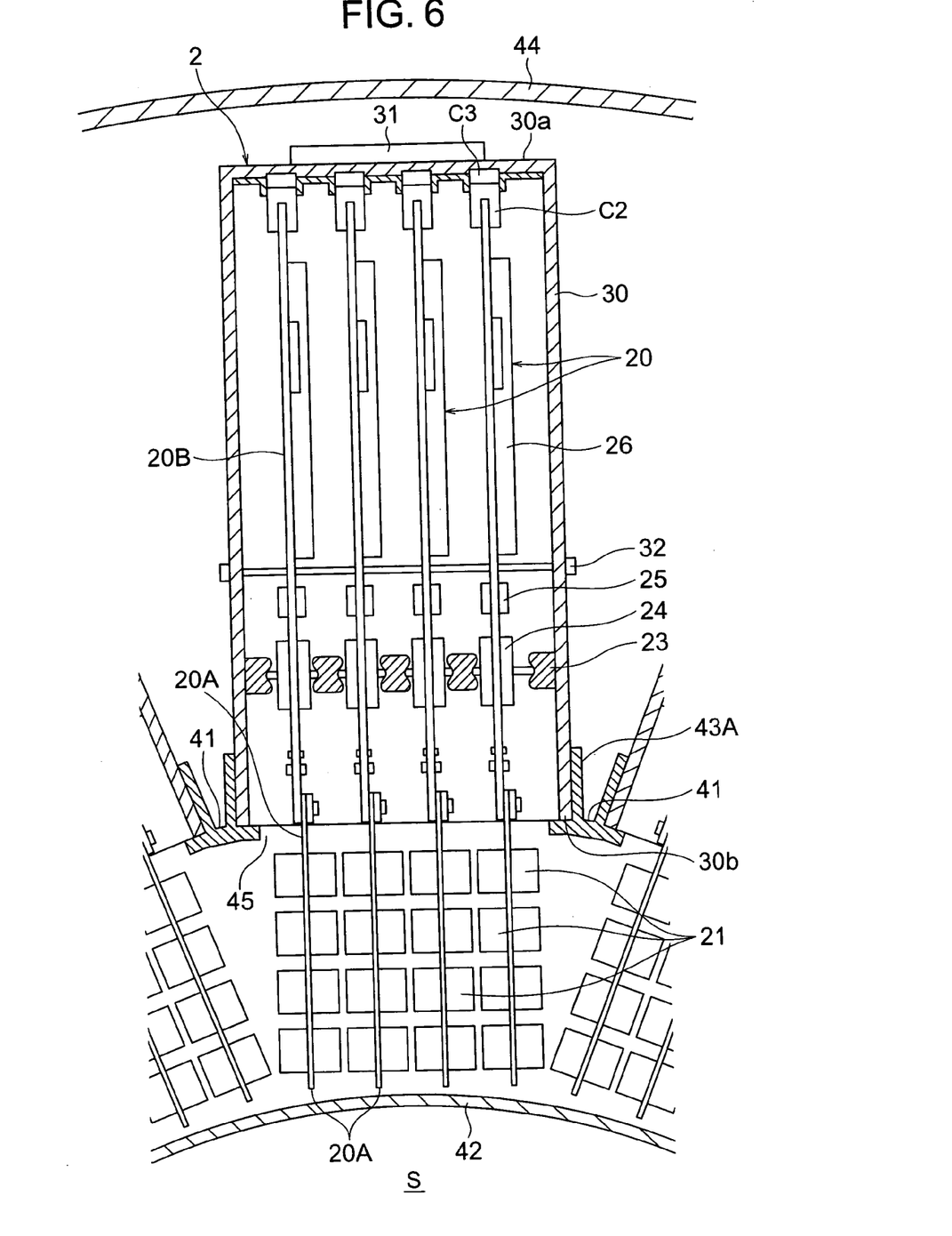
FIG. 6 is a cross-sectional view showing the state in which the detector unit 2 according to the first embodiment is fitted into a unit support section 43.

The detector unit 2 shown in FIG. 6 uses an electromagnetic shielding member 23 instead of the electromagnetic shielding cover 22 shown in FIG. 3 to protect the detectors 21 from electromagnetic waves generated from the integrated circuits. This electromagnetic shielding member 23 seals the opening of the housing 30 so as to prevent electromagnetic waves leaked from between the integrated circuits (digital ASIC, ADC 25, etc.) generating electromagnetic waves and detector substrate 20A from directly irradiating the detectors 21.

In FIG. 6, the electromagnetic shielding member 23 is disposed so as to fill the space formed between the neighboring analog ASICs 24, but this illustrates only an example, and the electromagnetic shielding member 23 can be disposed at an arbitrary position partitioning between the integrated circuits generating electromagnetic waves and detectors 21 or transmission sections of feeble analog signals which are the output signals thereof. Moreover, using an elastic material such as rubber for the electromagnetic shielding member 23 will simplify the sealing operation and can further obtain the effect of suppressing vibration in the deflection direction of the combined substrate 20 produced when the radiological imaging apparatus is moved.

Next, with reference to FIG. 5 and FIG. 6, a mode in which the detector unit 2 is mounted in the cylinder-shaped unit support section (ring-shaped support member) 41 attached to a support member (not shown) which is fixed to the floor will be explained. The aforementioned detection section 4 is constructed by attaching many detector units 2 to the unit support section 41 shown in FIG. 5. These detector units 2 are disposed in the circumferential direction of the unit support section 41. Thus, the detectors 21 are also disposed so as to surround the space S. As shown in FIG. 5, the detector unit 2 is attached to the unit support section 41 by inserting the detector substrate 20A into an opening 45 formed in the unit support section 41. The opening end 30*b* of the housing 30 is inserted into a flange 43A provided outside the unit support section 41 as shown in FIG. 6 and disposed in a freely withdrawable manner. Furthermore, the opening end 30*b* of the housing 30 contacts the unit support section 41. The flange 43A surrounds the end of the opening end 30*b* of the tubular body 30*d* of the housing 30 attached to the unit support section 41 and serves as a positioning member for the housing 30. Providing the flange 43A allows the detector unit 2 to be held at a predetermined position with high accuracy without deviations in the circumferential direction and axial direction of the detection section 4.

Figure 7:
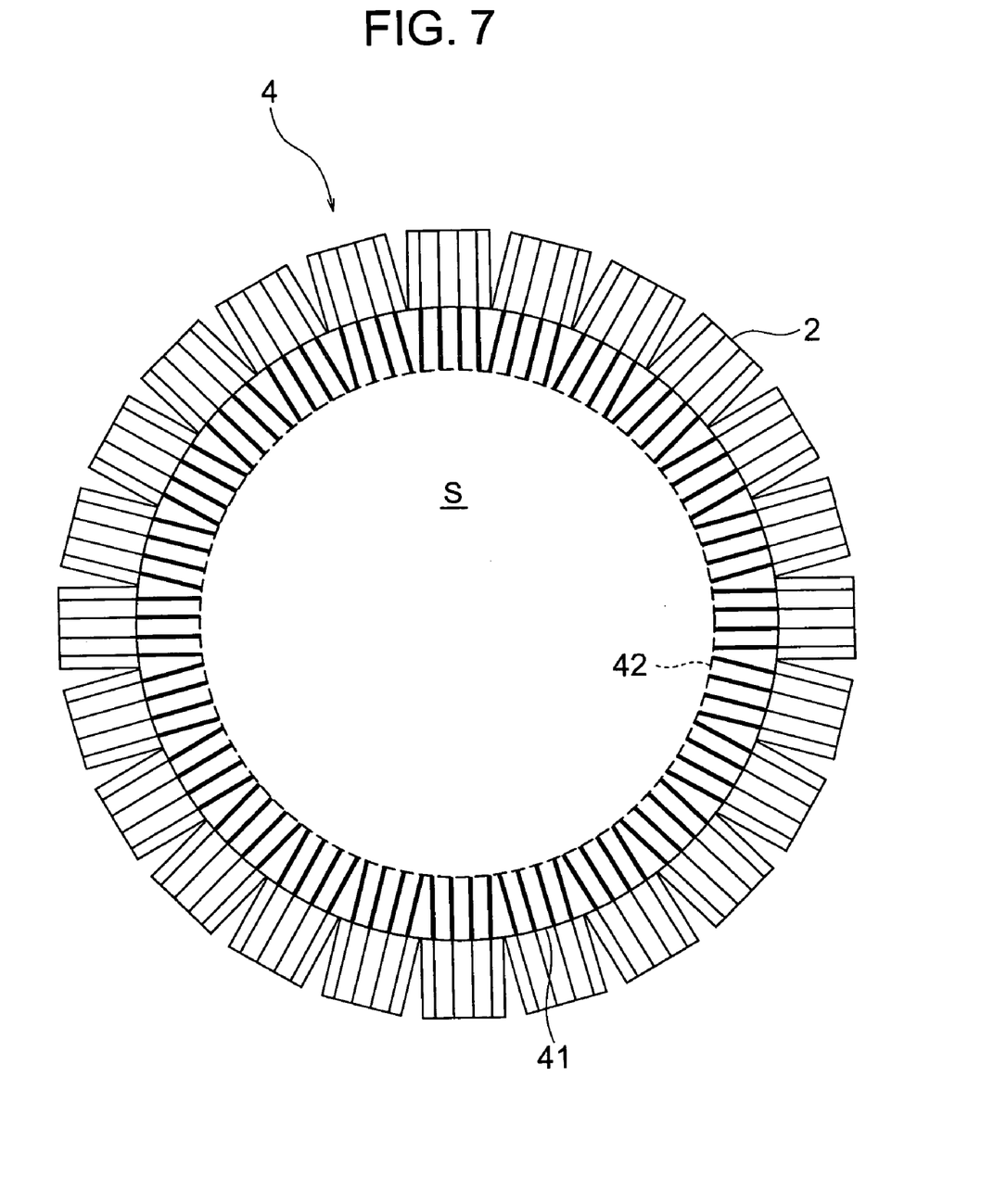
FIG. 7 is a cross-sectional view showing the state in which the detector units 2 according to the first embodiment are mounted in all unit support sections 43 provided on a unit support section 41.

With the detector unit 2 attached to the unit support section 41, each detector substrate 20A is disposed in such a way that the surface on which the detector 21 is installed is oriented in the circumferential direction of the detection section 4, that is, disposed in parallel to the direction in which the examining table 14 moves. Since the area in which the detectors 21 of the detector substrate 20A are mounted protrudes from the housing 30, many detectors 21 mounted on the detector substrate 20A are disposed inside the unit support section 41. As shown in FIG. 6, the detectors 21 provided at the end of the detector substrate 20A in the neighboring detector units 2 can be close-packed without being distanced from each other in the circumferential direction. Furthermore, as shown in FIG. 7, many detector units 2 as a whole are disposed on the outer surfaces of the unit support section 41 and in a detachable manner so as to orient toward the center of the unit support section 41. For this reason, the radiological imaging apparatus (PET apparatus) 1 normally uses an enormous number of detectors 21, for example, a hundred thousand to a few hundreds of thousands (/ch). However, attaching the detector units 2 to the unit support section 41 through a simple manual operation can shorten the time required to manufacture the imaging apparatus 11 provided with many detectors 21.

Moving and inserting the examining table 14 into the space S is equivalent to inserting the examining table 14 inside the cylinder-shaped unit support section 41. This is because the unit support sections 41 surround the space S.

Electromagnetic shielding is provided to prevent outside electromagnetic waves from irradiating around the detectors 21. More specifically, the housing 30 and unit support section 41 shown in FIG. 6 are made of a material having an electromagnetic shielding characteristic such as aluminum or an aluminum alloy and these components including the area in which the two components engage with each other are also constructed so as to prevent electromagnetic waves. The light shielding cylinder 42 using the electromagnetic shielding member is disposed so that the inner surface thereof is located near the free end of the detector substrate 20A and attached to the unit support section 41. The light shielding cylinder 42 prevents electromagnetic waves from entering the detectors 21 from the direction of the space S.

The electromagnetic shielding and light shielding methods in this embodiment are not limited to the methods described above. For example, it is also possible to use a method using an outer edge cover 44 shown in FIG. 6. The outer edge cover 44 is made of aluminum (or an aluminum alloy) which is also the electromagnetic shielding member as well as light-shielding member. The outer edge cover 44 surrounds the outer surface of the unit support section 41, covers all the detector units 2 attached to the unit support section 41 and is attached to the light shielding cylinder 42 in a detachable manner (not shown). The outer edge cover 44 prevents outside electromagnetic waves or light from entering.

(Explanation of Effects in Comparison with Comparative Example)

Next, the effects of the detector unit 2 according to this embodiment will be explained. Here, in order to show the effects of this embodiment more clearly, this embodiment will be explained in comparison with a comparative example shown in FIG. 10.

Figure 10:
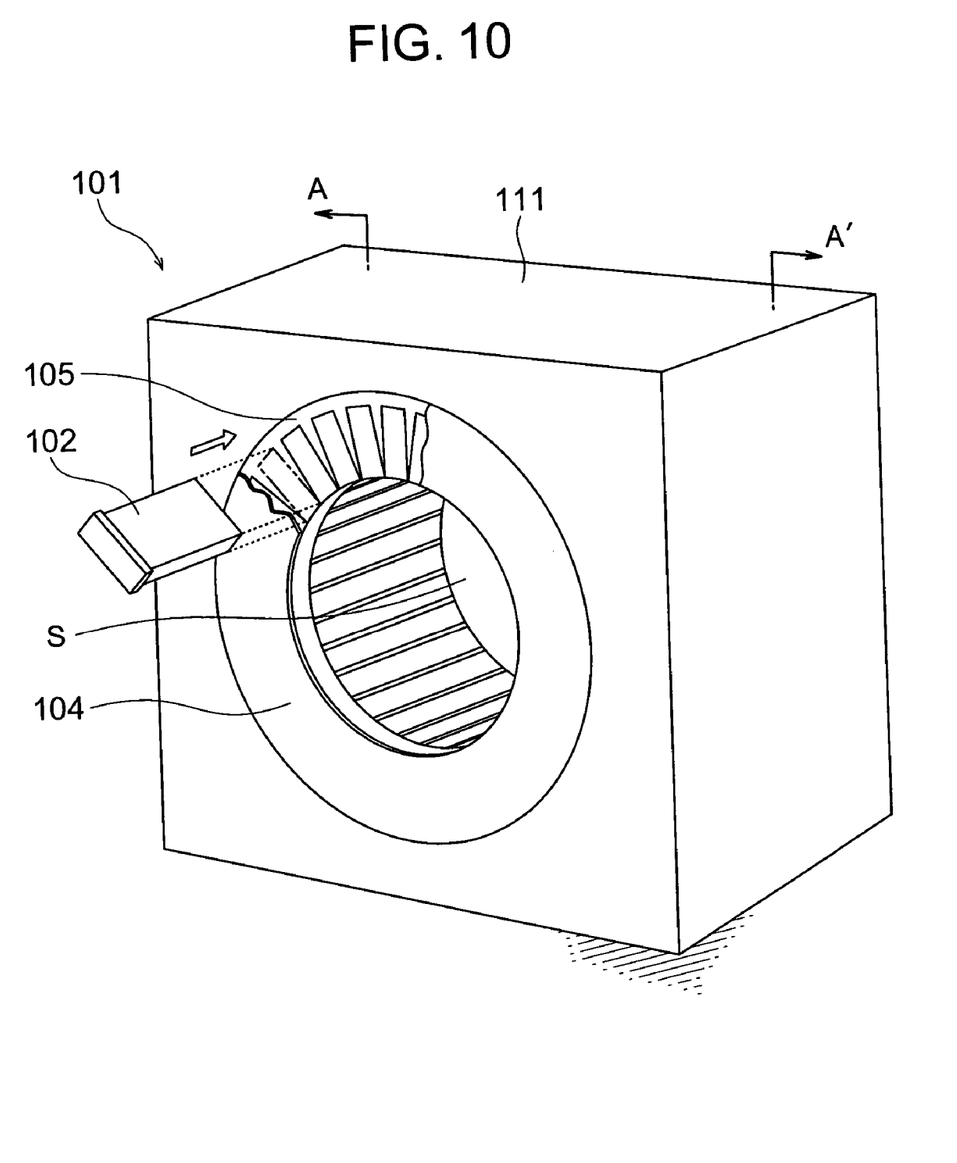
FIG. 10 is a perspective view showing a mode in which a detector unit 102 of a radiological imaging apparatus (PET apparatus 101) shown as an comparative example is replaced.

The comparative example shown here relates to the radiological imaging apparatus described in Japanese Patent Application No. 2003-340688 (corresponding to U.S. application Ser. No. 10/874,343 filed on Jun. 24, 2004). As shown in FIG. 10, an imaging apparatus 111 of a PET apparatus 101 in the comparative example is constructed so as to include a space S through which an examinee (not shown) is passed and a hollow cylinder-shaped detection section 104 disposed so that the direction around the body of this examinee constitutes the circumferential direction thereof. On one side of the detection section 104 is provided with a unit support section 105 having openings into which detector units 102 are fitted in a freely withdrawable manner. As shown by an outline arrow in FIG. 10, the detector unit 102 is inserted into the unit support section 105 from one side of the detection section 104 and attached to the imaging apparatus 111 in such a way that it can be easily replaced.

Figure 11:
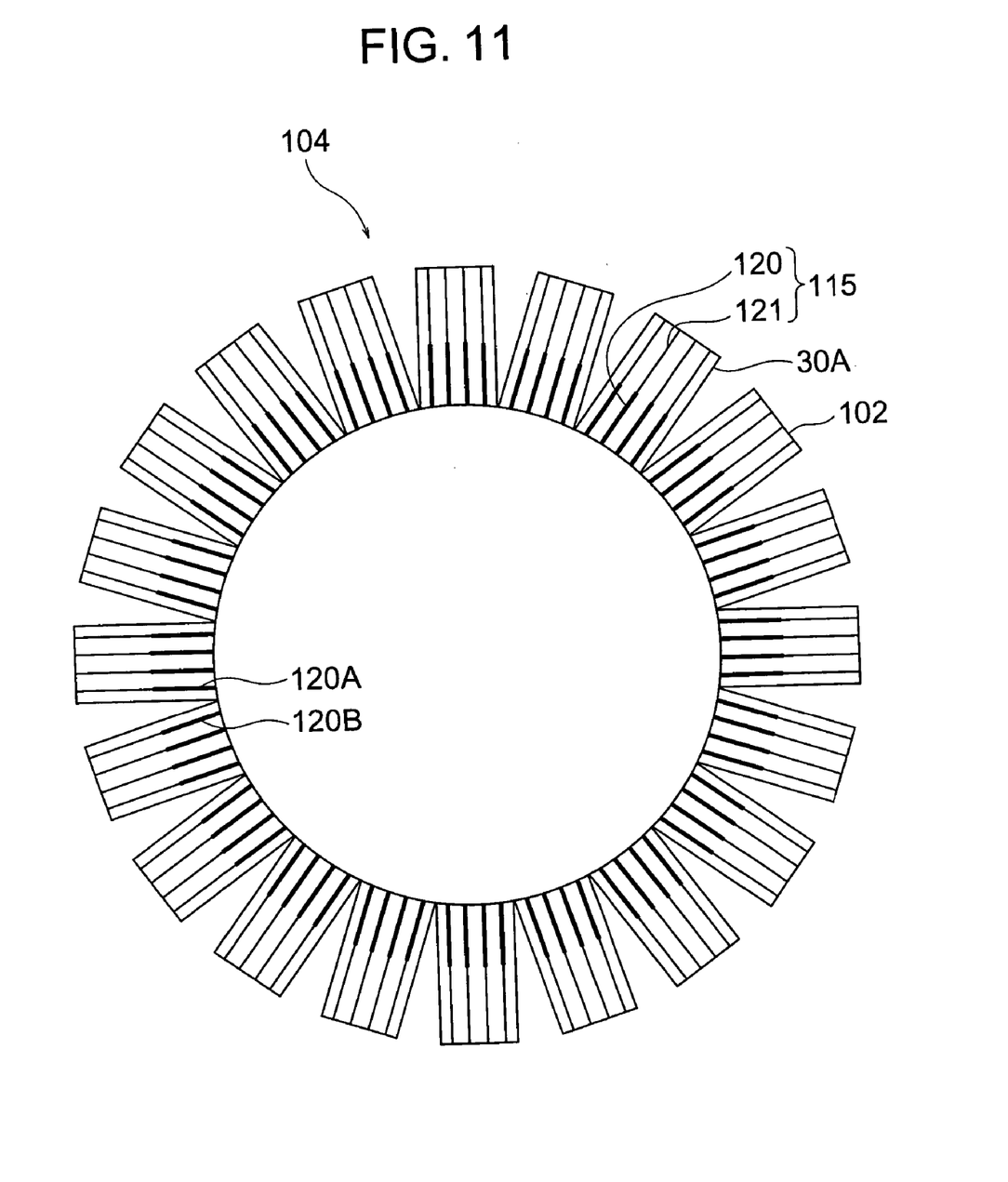
FIG. 11 is a cross-sectional view showing a section (A–A') in FIG. 10 of an imaging apparatus 111 of the radiological imaging apparatus (PET apparatus 101) shown as a comparative example.

However, the PET apparatus 101 in the comparative example shown in FIG. 10 has a problem that the mounting density of the detector substrates (or detectors) decreases. That is, the detector unit 102 in the comparative example is provided with a plurality of combined substrates 115 including a detector substrate 120 and a signal processing substrate 121 arranged in a housing 30A as shown in FIG. 4 of this embodiment. Unlike the housing 30 used in this embodiment, the housing 30A surrounds the entire combined substrate 115. All semiconductor radiation detectors attached to the detector substrate 120 exist in the housing 30A. For this reason, when a plurality of detector units 102 are attached to the unit support section 105, the respective housings 30A of the neighboring detector units 102 exist between a detector substrate 120A and a detector substrate 120B of the detector unit 105 as shown in FIG. 11. In such a structure, the distance between the detector substrate 120A and detector substrate 120B is greater than the distance between the neighboring detector substrates 120 in one detector unit 102. Therefore, in the comparative example, it is not possible to avoid the mounting density of detector substrates in the imaging apparatus 111, that is, detectors from decreasing.

In contrast to this, in this embodiment, since the area in which the detectors 21 of the detector substrate 20A are mounted are located outside the housing 30, it is possible to mount more detector units 2 than in the comparative example (FIG. 11) as shown in FIG. 7 (24 in this embodiment compared to 20 in the comparative example in the figure). Thus, this embodiment allows a close-packed arrangement of the detectors 21 in the circumferential direction of the detection section 4 while maintaining the structure of the detector unit 2 which allows easy replacement of detectors.

According to this embodiment, the following effects can be obtained.

(1) Since the detector unit 2 which includes a plurality of combined substrates 20 (FIG. 6) integrated into a unit is set in the unit support section 43, it is possible to drastically shorten the manufacturing time of the PET apparatus 1 to which many detectors 21 should be attached, or more specifically the imaging apparatus 11. When a problem such as a failure in a detector 21 occurs, it is possible to replace the detector unit 2 including the faulty detector 21 and facilitate operations such as maintenance and inspection.

(2) Since the detector substrate 20A is provided in the detector unit 2 so as to protrude from the inside of the unit support section 41 toward the space S (or examinee), the mounting density of the detectors 21 integrated into a unit does not reduce. In this way, it is possible to solve the problems in the comparative example such as reduction of spatial resolution in the PET apparatus 1, deterioration of image quality of tomographic images obtained, increase of numerical calculations for creating complementary images for undetected areas or increase in the inspection time.

(3) Since the detector substrates 20A of a plurality of detector units 2 housed in the housing 30 supported by the ring-shaped unit support section 41 protrude from the opening 45 of the housing 30 and are disposed inside the unit support section, no housing 30 exists inside the unit support section 41 and between the neighboring detector units 2 in the circumferential direction of the unit support section 41. This allows the detectors 21 of the neighboring detector units 2 inside the unit support section 41 to come closer to each other, increasing the number of detection units 2 that can be arranged in the circumferential direction. The mounting density of the detectors 21 in the circumferential direction of the unit support section 41 is also improved. This improves the spatial resolution in γ-ray detection and improves the spatial resolution of a tomogram of an examinee. Providing a tomogram with high positional resolution makes it possible to detect smaller cancers and realize a detailed diagnosis. An improvement in the mounting density of the detectors 21 results in an improvement in the detection efficiency and can shorten the inspection time.

(4) Since the housing 30 can be attached to the unit support section 41 in a detachable manner, it is possible to remove the detector unit 2 from the unit support section 41 or attach the detector unit 2 to the unit support section 41 in a short time. In the event of a problem such as a failure of the detector 21, removing and replacing the detector unit 2 including the faulty detector 21 allows the time required for maintenance and inspection to be shortened.

(5) Since the detectors 21 and integrated circuits which constitute major parts liable to failures of the PET apparatus 1 are mounted on a substrate and integrated into a unit and made replaceable, it is also possible to drastically shorten the working time required for maintenance and inspection or troubleshooting.

(6) Since the detector substrate 20A is attached to the signal processing substrate 20B in a detachable manner, when a detector 21 provided on the detector substrate 20A fails, it is possible to replace only the detector substrate 20A including the faulty detector 21. This eliminates the waste that the entire combined substrate 20 should be replaced when a detector 21 fails.

(7) Since the combined substrate 20, that is, the detector substrate 20A is provided with the detectors 21 on both sides, it is possible to share the substrate compared to the case where the detectors 21 are provided on only one side. This makes it possible to reduce the number of substrates by half and arrange the detectors 21 densely in the circumferential direction. In addition, the number of detector substrates 20A can be reduced by half, and therefore there is also a merit of saving time and trouble in operations such as mounting the combined substrates 20 in the housing 30.

(8) Adopting a structure in which the surface of the detector substrate 20B is parallel to the central axis Z increases the number of detectors 21 that can be mounted per substrate. The use of a more highly integrated (capable of processing more channels) ASIC can reduce the size of the signal processing substrate 20B and also reduce the size of the detector unit 2, or further the PET apparatus 1. Moreover, it is possible to increase the number of detector units 2 without changing the structure of the signal processing substrate 20B and reduce the dead space of the detectors 21 between the detector units 2 (approximate the shape of the detectors to a cylindrical shape). This reduces image noise such as artifacts caused by the dead space between the units and can provide a higher definition PET image.

(9) Arranging the electromagnetic shielding member 23 between the integrated circuits and detectors 21 can suppress the superimposition of noise caused by electromagnetic waves irradiated from digital circuits such as integrated circuits on feeble γ-rays detection signals output from the detectors 21. The reduction of noise improves the time accuracy of γ-ray detection and can shorten the length of the coincidence counting time window and thereby reduce random events which constitute noise components. This improves the quality of a PET image and shortens the inspection time. Furthermore, the reduction in nose improves the energy discrimination accuracy of γ-rays and can remove more γ-rays which have been scattered in the body of the examinee and have lost energy. These events of internal scattered radiation constitute noise components and the reduction of such noise can improve the quality of a PET image and shorten the inspection time.

(10) The use of the electromagnetic shielding member 23, which is an elastic body, simplifies the sealing operation and also produces the effect of suppressing vibration in the deflection direction of the combined substrate 20 generated when the radiological imaging apparatus is moved.

(11) Providing the electromagnetic shielding cover 22 which covers the digital circuit elements such as integrated circuits for the signal processing substrate 20B can suppress the superimposition of noise caused by electromagnetic waves on feeble γ-ray detection signals. This also facilitates detachment/attachment of the signal processing substrate 20B from/to the detector unit 2 and can drastically shorten the operation time required for manufacturing, maintenance and inspection and troubleshooting. It is naturally possible to reduce noise and improve the quality of a PET image and shorten the inspection time as described in (9).

(12) Disposing the light shielding cylinder 42, which is an electromagnetic shielding member, inside a free end of the detector substrate 20A can suppress outside electromagnetic waves from entering and suppress the superimposition of noise on feeble γ-rays detection signals. The specific effects by the noise reduction are as described in (9).

(13) Putting the light shielding cover 30C on the detector units 2 can reduce noise components due to light output from the detectors 21.

(14) Disposing the light shielding cylinder 42 inside the free end of the detector substrate 20A can reduce noise components caused by light output from the detectors 21 and eliminate the necessity for the light shielding member required between the detector units 2. It is possible to shorten the distance between the detector units 2, that is, distance between the neighboring detectors 21 and improve the mounting rate of the detectors 21.

(15) Making the outer edge cover 44 which is the electromagnetic shielding member and at the same time the light-shielding member surround the outside of the plurality of detector units 2 attached to the unit support section 41 and attaching the outer edge cover 44 to the unit support section 41 in a detachable manner can prevent outside electromagnetic waves and light from entering the detectors 21. This also produces the following effects. i) Eliminates the necessity for the light-shielding member and electromagnetic shielding member required for the combined section of the unit support section 41 and detector units 2 and simplifies the unit support section 41. (ii) Partially eliminates the necessity for the light-shielding and electromagnetic shielding functions required for the housing 30 and can simplify and also reduce the weight of the housing 30. (iii) Partially eliminates the necessity for the light-shielding and electromagnetic shielding properties required for the housing 30, and can thereby provide the housing 30 with an air vent for cooling the integrated circuits and cool the integrated circuits efficiently. It is possible to further improve the cooling efficiency by air-cooling the detector units 2 using a cooling fan set in the detector units 2 and further setting a mechanism for cooling the air in the space formed between the outer edge cover 44 and unit support section 41.

(Second Embodiment)

Figure 8A:
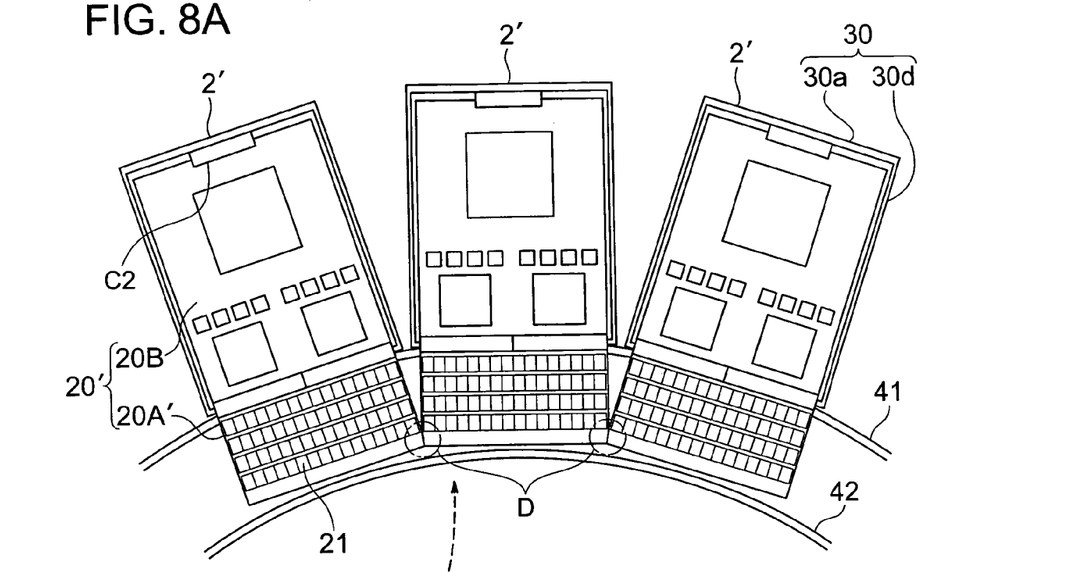
FIG. 8A is an enlarged view of part of an imaging apparatus 11' in which detector units 2' according to a second embodiment are mounted.
Figure 8B:
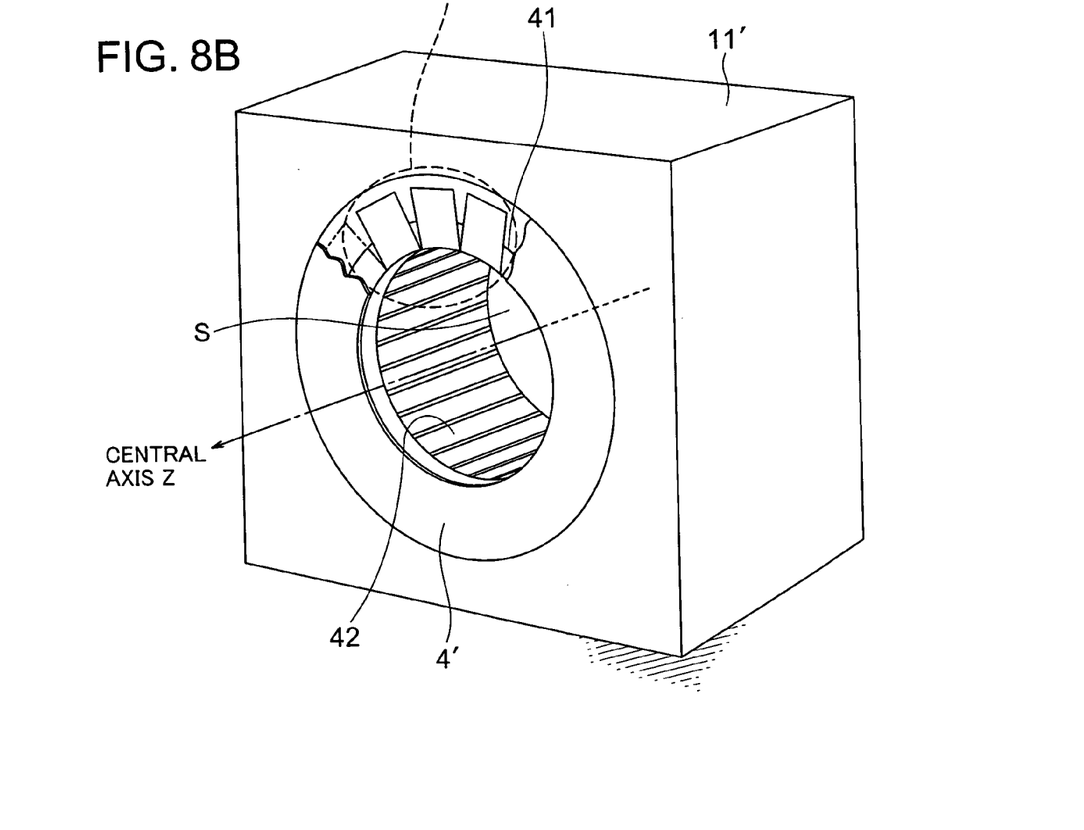
FIG. 8B is an overall perspective view of the imaging apparatus 11' whose enlarged view is shown above.
Figure 9:
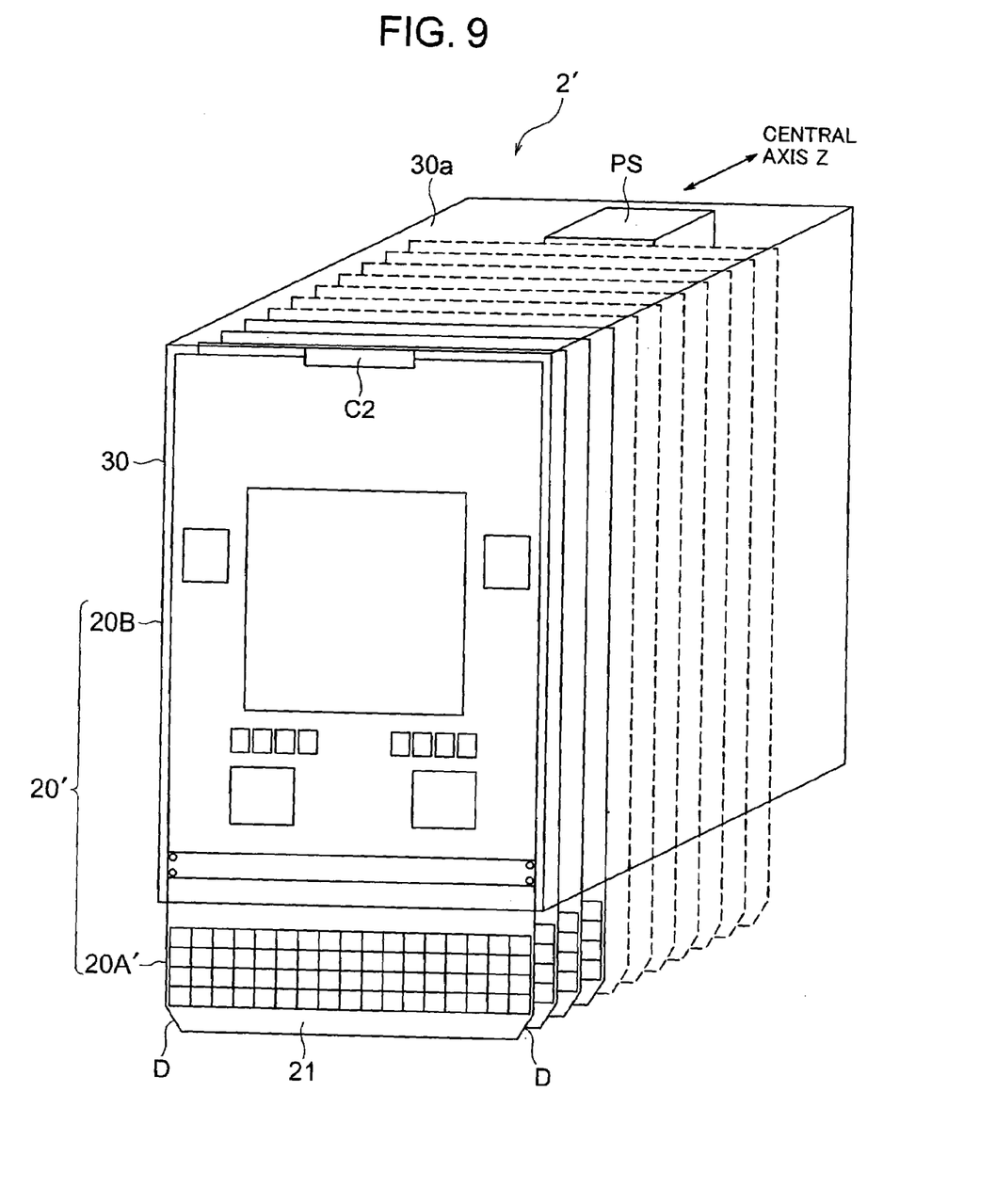
FIG. 9 is a perspective view showing an outline and internal structure of the detector unit 2' according to a second embodiment.

With reference to FIGS. 8A, 8B and 9, a PET apparatus which is a radiological imaging apparatus according to a second embodiment of the present invention will be explained. The same components in this embodiment as those in the first embodiment are assigned the same reference numerals and the corresponding components are suffixed with "'" and detailed explanations thereof will be omitted. The PET apparatus in this embodiment differs from the aforementioned PET apparatus 1 in the structure of the detector unit. The rest of the structure of the PET apparatus of this embodiment is the same as that of the PET apparatus 1. An imaging apparatus 11' used for the PET apparatus in this embodiment has a structure with the detector unit 2 of the imaging apparatus 11 replaced by a detector unit 2'. The detector unit 2' used for the PET apparatus in this embodiment consists of a plurality of combined substrates 20' arranged in parallel in a housing 30 in parallel to the narrow side walls of the housing 30. The combined substrate 20' includes a detector substrate 20A' and the signal processing substrate 20B used for the PET apparatus 1. The detector substrate 20A' is different from the detector substrate 20A in that both corners at one end of the substrate of the detector substrate 20A used for the PET apparatus 1 are diagonally truncated and notches D are formed. The rest of the structure of the detector substrate 20A' is the same as that of the detector substrate 20A. Forming the notches D causes inclined planes to be formed in both corners at the end (located outside the housing 30) of the detector substrate 20A'.

As shown in FIGS. 8A, 8B and 9, the detector units 2' arranged in the circumferential direction of a cylinder-shaped unit support section 41 arrange the combined substrates 20' in such a way that the surfaces of all the combined substrates 20' in the housing 30 on which the detectors 21 are mounted are oriented in the direction of the central axis Z of the space S, that is, the direction in which an examining table 14 moves (longitudinal direction of the examining table 14).

As shown in FIG. 8A, the corners on the free end side of the detector substrate 20A' in the second embodiment are provided with the notches D so that the neighboring detector substrates 20A' in the circumferential direction of the unit support section 41 do not interfere with each other. The structure except the notches D of the detector substrate 20A' is the same as that of the detector substrate 20A. These notches D prevent the degree of denseness in the circumferential direction of the detector 21 from decreasing.

According to this embodiment, the following effects can be obtained.

(15) Arranging the combined substrates 20 with their surfaces oriented in the direction in which the examining table 14 moves prevents the substrates from being located between the detectors 21 in the circumferential direction as shown in FIG. 6. This can improve the arrangement density of the detectors 21 in the circumferential direction of the unit support section 41. Therefore, it is possible to further improve the effect in (3).

(16) By forming the notches D in the corners on the free end side of the detector substrate 20A, that is, providing inclined planes and causing the inclined planes of the detector substrates 20A of the neighboring detector units 2 in the circumferential direction to contact each other, it is possible to minimize the space between the detector substrates 20A. This can further improve the mounting density of the detectors 21 in the circumferential direction. It is also possible to reduce image noise such as artifacts caused by dead space of the detectors between the detector units 2 and provide a PET image with higher definition.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radiological imaging apparatus comprising an imaging apparatus including:
   a bed which supports an examinee and moves;
   a ring-shaped support member into which said bed is inserted; and
   a plurality of detector units arranged in a circumferential direction of said support member and supported by said support member,
   wherein said detector unit comprises a plurality of unit substrates including a plurality of semiconductor radiation detectors and integrated circuits which process radiation detection signals output from these semiconductor radiation detectors and a housing in which these unit substrates are housed and attached,
   areas of said plurality of unit substrates in which said semiconductor radiation detectors exist protrude from an opening of said housing, and
   said areas of said detector units are disposed inside said support member and said housing is supported by said support member.

2. The radiological imaging apparatus according to claim 1, said housing is attached to said support member in a detachable manner.

3. The radiological imaging apparatus according to claim 1, wherein said unit substrate comprises a first substrate and a second substrate, and
   said first substrate comprises said semiconductor radiation detectors and said second substrate comprises said integrated circuits.

4. The radiological imaging apparatus according to claim 1 or 3, wherein said semiconductor radiation detectors are arranged on both sides of said unit substrate.

5. The radiological imaging apparatus according to claim 1 or 3, wherein the surface of said unit substrate on which said semiconductor radiation detectors are mounted is oriented in a direction in which said bed moves.

6. The radiological imaging apparatus according to claim 5, wherein inclined planes are formed in corners of said unit substrate located inside said support member and said inclined planes of neighboring unit substrates in a circumferential direction of said support member contact each other.

7. The radiological imaging apparatus according to claim 1 or 3, wherein the surface of said unit substrate on which said semiconductor radiation detectors are mounted is oriented in a circumferential direction of said support member.

8. The radiological imaging apparatus according to claim 1 or 3, wherein said unit substrate comprises an electromagnetic shielding member which covers said integrated circuits.

9. The radiological imaging apparatus according to claim 1 or 3, wherein said detector unit arranges an electromagnetic shielding member which shields a space in said housing between said integrated circuits and said semiconductor radiation detectors of said unit substrate.

10. The radiological imaging apparatus according to claim 9, wherein said electromagnetic shielding member has elasticity.

11. The radiological imaging apparatus according to claim 1 or 3, wherein an electromagnetic shielding cylinder is disposed inside one end of said unit substrate located inside said support member of said unit substrate and said bed is inserted into this electromagnetic shielding cylinder.

12. The radiological imaging apparatus according to claim 11, wherein a cover having an electromagnetic shielding function is disposed outside said support member and outside said plurality of detector units and attached to said support member.

13. The radiological imaging apparatus according to claim 1 or 3, wherein in each of said detector units, a portion of said unit substrate located inside said support member is covered with a light shielding cover.

14. The radiological imaging apparatus according to claim 1 or 3, wherein a light shielding cylinder is disposed inside one end of said unit substrate located inside said support member of said unit substrate and said bed is inserted into this light shielding cylinder.

15. A detector unit comprising:
a plurality of unit substrates including a plurality of semiconductor radiation detectors and integrated circuits which process radiation detection signals output from these semiconductor radiation detectors; and
a housing in which these unit substrates are housed and attached,
wherein areas of said plurality of unit substrates in which said semiconductor radiation detectors exist protrude outward from an opening of said housing.

16. The detector unit according to claim 15, wherein said unit substrate includes a first substrate and a second substrate, and
said first substrate includes said semiconductor radiation detectors and said second substrate includes said integrated circuits.

17. The detector unit according to claim 15 or 16, wherein said semiconductor radiation detectors are disposed on both sides of said unit substrate.

* * * * *